Patented Feb. 19, 1935

1,991,629

UNITED STATES PATENT OFFICE 1,991,629

PRESERVED AND DRIED YEAST

Henry Riley, Kearny, N. J.; Edith Riley administratrix of said Henry Riley, deceased No Drawing. Application November 1, 1932, Serial No. 640,667

5 Claims. (Cl. 99—10)

This invention relates to a method of producing a compressed or preserved dried yeast which is superior to the ordinary so-called yeast used in bakeries and the like.

It is well known that in the desiccation of yeast by means of heat that a change takes place because dried yeast solutions exert a reducing action while fresh yeast solutions do not. There is ample proof that some change takes place and it is safe to assume that such change or changes has considerable effect upon the components of the yeast, i. e., the glucoses, zymases, nucleins, fats, etc.

With a knowledge of the above facts, I have discovered a new method and process for the drying of yeasts or similar fungi.

With these facts in mind, the nature of the invention will be seen from the following illustrative example:

Example 1

I mix with a small amount of water, about four or five ounces, such a material as finely powdered calcium sulphate or magnesium carbonate, preferably one and one-half ounces, or any finely powdered materials which when strongly and thoroughly agitated with the said amount of water will form a cream which is highly aerated and becomes a mass of air bubbles and also is greatly increased in volume.

This highly aerated mass of cream is then mixed thoroughly with preferably one pound of yeast, which has been previously dissolved in about five ounces of water, such yeast not having heretofore been dried or heated but is in the form usually used before compressing or drying, i. e., the yeast is in a thin paste or creamy condition.

This mixture is then poured or forced into molds or in any desired shape and exposed to atmosphere which is preferably dry but not heated. The aerated mineral cream will then quickly release its content of water and also assist in a very rapid release of the water of the yeast thereby allowing a rapid drying without the use of heat.

The formation of the mineral cream in a highly aerated condition may be produced by the use of many minerals with small amounts of water and sufficient agitation in beating.

These aerated minerals also when mixed so intimately with the yeast assist in supplying oxygen to the yeast and thereby facilitate the supplying of the yeast with the oxygen necessary for complete propagation and growth of the yeast.

The presence of minerals which are inert in the dried product and do not cause or assist in but tend to prevent any absorption of water from the air by the dried yeast causes the yeast which is dried by this method to be completely preserved against deterioration or spoilage from change of climate or like influence.

I also find that I can mix with the yeast and aerated mineral a suitable amount of corn meal or any other desired or suitable grain meal. The effect of these added meals being to increase the volume of the resulting product. I may also add suitable or desired amounts of dried milk or chocolate to the mixture of yeast and aerated mineral.

While the foregoing is generally descriptive of the process employed and ingredients used, it is to be understood that the same may be modified in minor respects, in proportion, time periods and that the substitution of equivalents for the mentioned mineral salts may be made without departing from the spirit and scope of the invention as recited in the appended claims.

Having thus described by invention, what I claim as new and desire to secure by Letters Patent, is:

1. A composition of matter, comprising yeast mixed with aerated calcium sulphate cream.

2. The method of making a yeast compound, comprising mixing yeast with aerated calcium sulphate cream, then drying the mixture.

3. The method of making a yeast compound, comprising whipping calcium sulphate with water to form an aerated cream, mixing yeast with the cream thus formed, then drying the mixture.

4. The method of making a yeast compound, comprising whipping one and one-half ounces of calcium sulphate with five ounces of water to form an aerated cream, mixing one pound of yeast with five ounces of water, then mixing the yeast and cream, then drying the mixture.

5. The method of making a yeast compound, comprising whipping one and one-half ounces of calcium sulphate with five ounces of water to form an aerated cream, mixing one pound of yeast with five ounces of water, then mixing the yeast and cream, then drying the mixture by adding eight ounces of corn meal.

HENRY RILEY.